UNITED STATES PATENT OFFICE.

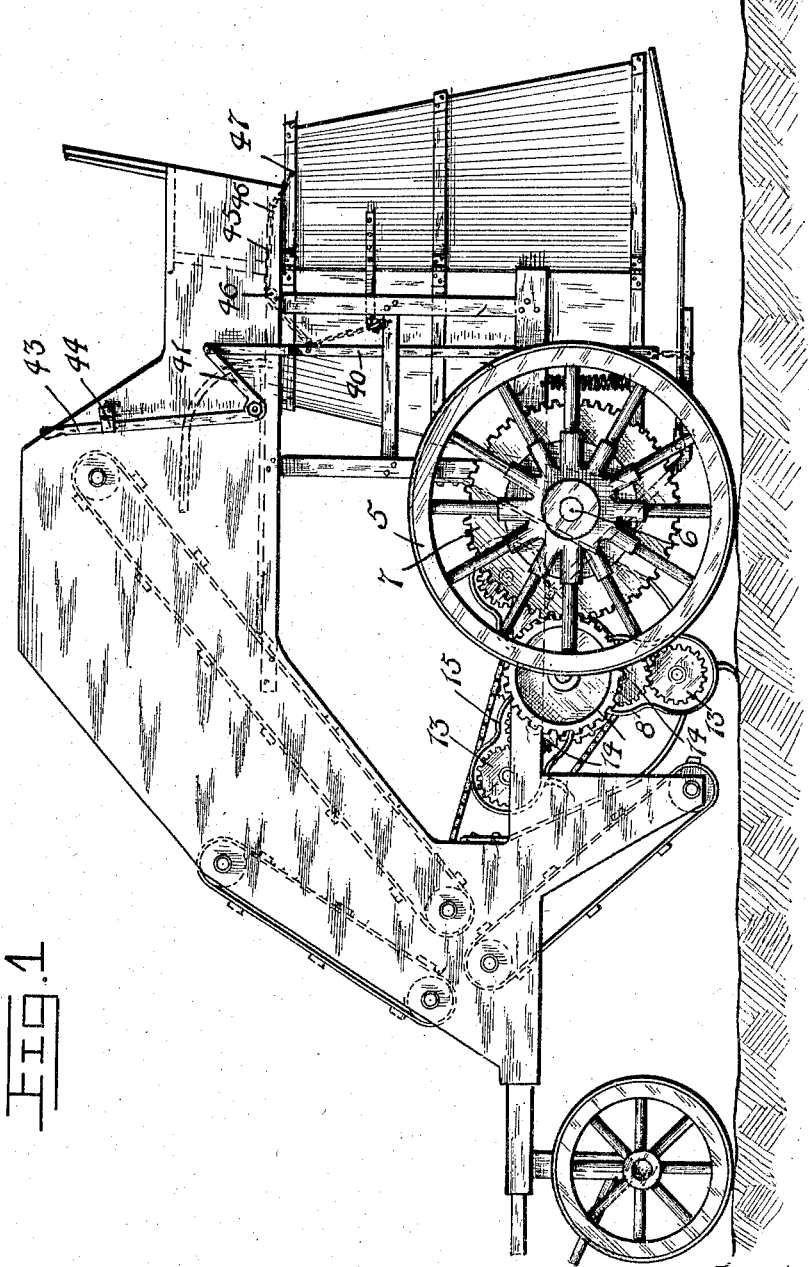

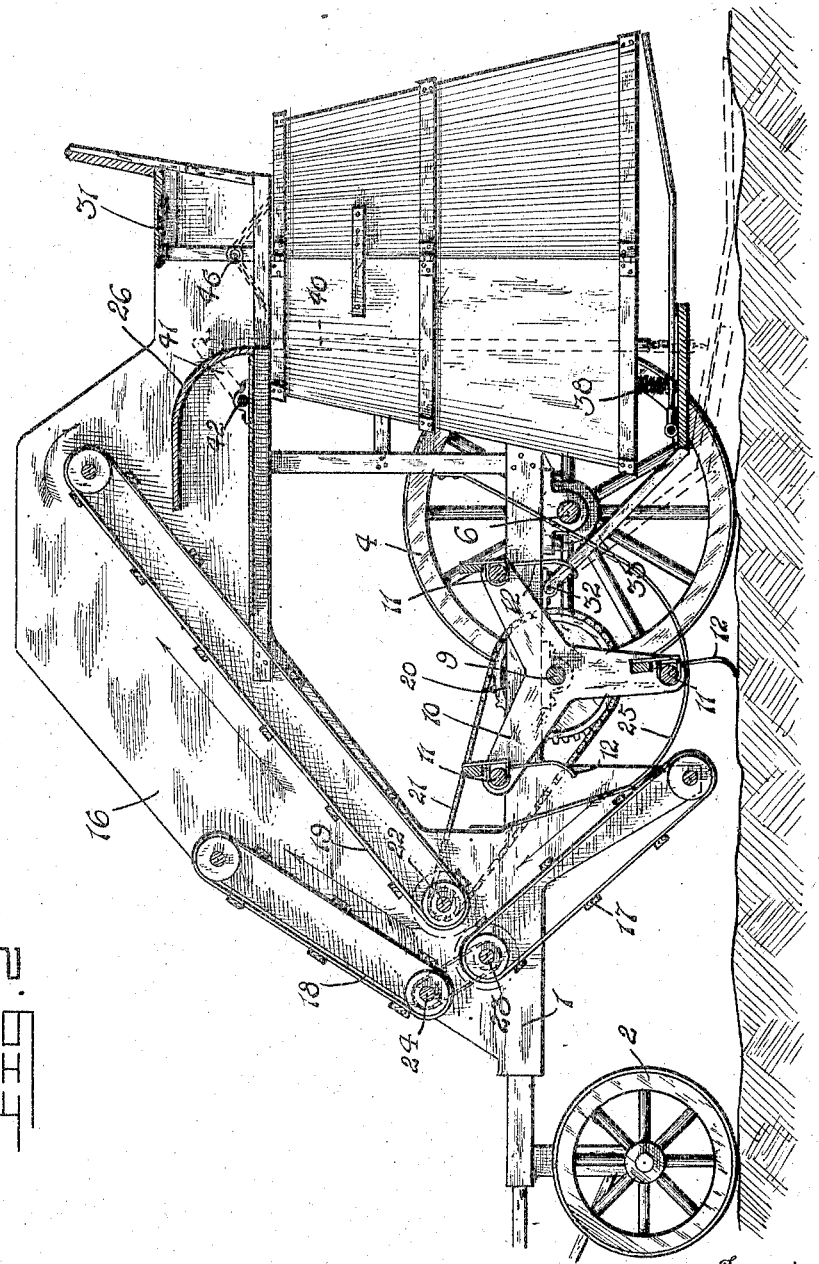

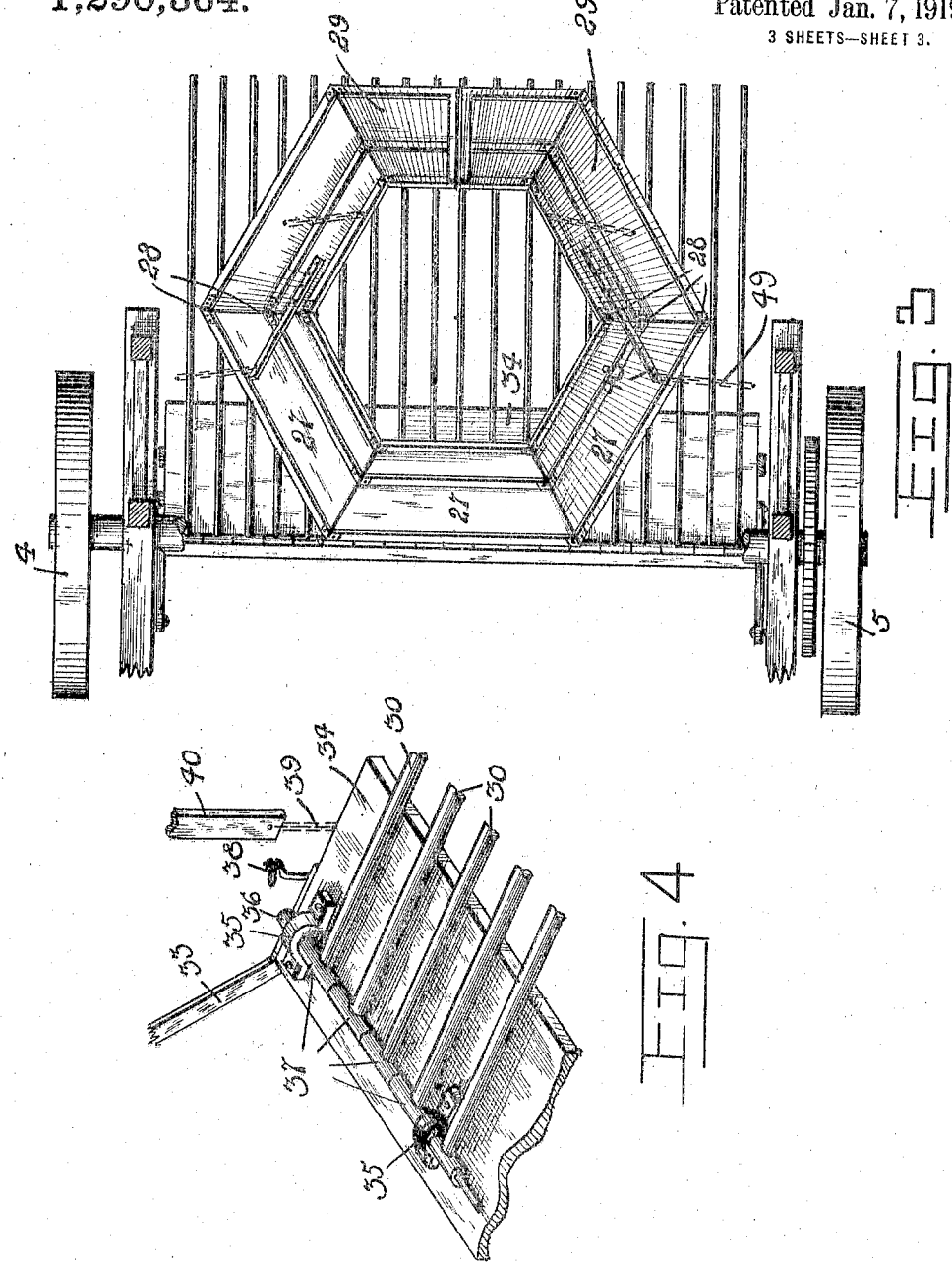

AVILA SAVIGNAC, OF JOLIETTE, QUEBEC, CANADA.

HAYCOCKING-MACHINE.

1,290,364.  Specification of Letters Patent.  Patented Jan. 7, 1919.

Application filed October 4, 1917. Serial No. 194,662.

*To all whom it may concern:*

Be it known that I, AVILA SAVIGNAC, a subject of the King of Great Britain, residing at Joliette, Province of Quebec, Canada, have invented certain new and useful Improvements in Haycocking - Machines; and I do hereby declare that the following is a full, clear, and exact description of the invention, such as will enable others skilled in the art to which it appertains to make and use the same.

The present invention relates to hay cocking machines, and an object of the present invention is to provide a power operated apparatus of this character which will rake hay from the fields, form the same into cocks and finally deposit the cocks on the field in the path of travel of the apparatus and at the rear thereof.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Figure 1 is a side elevation of the apparatus embodying the present invention;

Fig. 2 is a vertical section through the same, but showing the cock former in elevation;

Fig. 3 is a horizontal detail section of the rear end of the machine showing the cock former in plan view; and, Fig. 4 is a detail perspective view of the fork connections.

Referring now more particularly to the accompanying drawings wherein like and corresponding parts are designated by similar reference characters throughout the several views, The apparatus herein shown comprises a wheeled frame 1 which is supported at its forward end by means of the steering wheels 2 and at its rear end by means of the wheels 4 and 5 which are supported upon the axle 6. Secured to the wheel 5 is a gear wheel 7 which is in mesh with a gear 8 and the latter is carried by a shaft 9 journaled within suitable bearings supported upon the frame 1. Supported upon the shaft 9 are the spiders 10 which spiders have journaled at their outer ends the shafts 11, and each shaft 11 has connected thereto a plurality of rake blades 12. These shafts 11 at one end thereof are provided with the gear wheels 13 which are in mesh with idler gears 14 and the latter are in mesh with a gear keyed upon the shaft 9 and the latter is not shown. These gears are all incased in a suitable housing 15 arranged adjacent one end of the shaft 9. Supported upon the frame 1 adjacent its forward end is a suitable casing 16 having the endless belts 17, 18 and 19 supported thereupon. Carried by the shaft 9 is a sprocket wheel 20 and adapted to pass over this sprocket wheel is a sprocket chain 21 which is operatively connected with a sprocket wheel carried by the shaft 22 of the endless belt 19. This shaft 22 is operatively connected to the shafts 23 and 24 of the respective endless belts 17 and 18, so that upon the rotation of the shaft 9 these endless belts will be caused to travel in the direction of the arrows as shown in Fig. 2.

From the foregoing it is obvious that as the machine passes over the ground the wheel 5 will be rotated and through the gearing connected therewith, the shaft 9 will also be rotated. As this shaft 9 rotates the rakes 12 will be caused to rotate and pass through the grid 25, whereby the straw upon the ground will be lifted up by means of the rakes 12 and deposited upon the endless conveyer 17. This straw is then carried upon the conveyer 17 between the conveyers 18 and 19 and subsequently upon the conveyer 19 and will be finally deposited upon the platform 26.

Connected to the frames 1 and 16 and adjacent their rear ends is a cock former which is preferably of a truncated pyramidical configuration and comprising a plurality of sections. The sections 27 of this former are rigidly connected together and hingedly connected as at 28 to these sections are the swinging sections 29. As the hay or straw which has been deposited upon the platform 26 passes within the former it is retained therein by means of a bottom which is made of a plurality of forks 30. Carried by the frame 16 is an operator's seat 31 whereby the operator may direct the hay from the conveyer 19 into the cock former.

Pivotally connected as at 32 to the frame 1 are a pair of brackets 33 and the lower ends of these brackets have secured thereto a transverse horizontally arranged plate 34. Secured to the upper face of this plate 34 are the bearings 35 in which is journaled a shaft 36 and rotatably mounted upon this shaft 36 are the bearings 37 carried by one end of the forks 30. Connecting this plate 34 with the frame 1 are the coil springs 38 which normally retain the plate 34 and the forks 30 in an elevated position, as better shown in Figs. 1 and 2. Connected to the plate 34 by means of the chain 39 are the vertical rods 40. The upper ends of these rods 40 are connected to the crank arms 41 and these crank arms are connected by a shaft 42 journaled upon the frame 16. Arranged at one side of the machine and connected to the shaft 42 is an operating lever 43 and this lever 43 is adapted to be retained in the position as shown in Fig. 1 by means of the clip 44. Connected to the rods 40 are the chains 45 and these chains pass over the rollers 46 and have their opposite ends connected to the sections 29 of the former as at 47. Also connected to these sections 29 are the bars 48 and these bars are connected to the rods 40 by means of the chains or other suitable flexible members 49.

From the foregoing it is obvious that as the hay is deposited within the former it will rest upon the forks 30, but when it is desired to release the hay from the former the lever 43 is released so that it may permit the rods 40 to lower and in lowering these rods the weight of the hay upon the forks 30 will cause these forks and the plate 34 to descend and rest upon the ground, as better shown in dotted lines in Fig. 2. When the rods 40 have been depressed the chains 45 will exert a pull upon the sections 29, thereby causing the sections to swing upon their pivoted connections 28 and thereby opening the former so that the hay will be released therefrom. In moving the handle 43 in an opposite direction, or until it has assumed the position as shown in Fig. 1, the plate 34 will be raised which in turn will also raise the forks 30 and a pull will be exerted upon the chains 49, thereby causing the sections 29 of the former to close or assume the position as better shown in Fig. 3 and this closing operation of the sections 29 is effected through the bars 48.

By pivotally and independently connecting the forks 30 to the shaft 36, these forks will be permitted to give due to any obstructions or any irregularities upon the ground over which the device is traveling, thereby preventing the same from breaking and at the same time acting as a suitable support for the hay within the cock former.

Having thus fully described my invention, what I claim as new and desire to secure by Letters Patent is:

1. A haycocking machine comprising a wheeled supporting frame, a cock former carried by said frame, brackets hingedly connected to said frame and extending below said former, a plate supported upon the lower ends of said brackets, a shaft journaled upon said plate, a plurality of forks independently connected to said shaft resting upon and projecting beyond said plate below said former, coil springs for normally holding said plate in a raised position, and means for raising said plate substantially as and for the purpose specified.

2. A haycocking machine comprising a wheeled supporting frame, a cock former carried by said frame, said former having a stationary portion and two movable sections, one edge of each of said movable sections being hingedly connected to the stationary portion of the former, a plurality of forks arranged below said former, a pair of vertical rods mounted upon said frame, the lower ends of said rods being flexibly connected to said forks, a lever mounted upon said frame for raising and lowering said rods, and means connecting said movable sections of the former to said rods whereby when said rods are raised and lowered said movable sections may be opened or closed substantially as and for the purpose set forth.

In witness whereof I have hereunto set my hand.

AVILA SAVIGNAC.

Copies of this patent may be obtained for five cents each, by addressing the "Commissioner of Patents, Washington, D. C."